UNITED STATES PATENT OFFICE.

ERNST ELLENBERGER, OF BIEBRICH, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

TREATMENT OF GASES FOR REMOVING CARBON MONOXID THEREFROM AND REPLACING IT BY HYDROGEN.

989,955.      Specification of Letters Patent.      Patented Apr. 18, 1911.

No Drawing.      Application filed December 10, 1909. Serial No. 532,470.

*To all whom it may concern:*

Be it known that I, ERNST ELLENBERGER, a subject of the German Emperor, and resident of Biebrich-on-the-Rhine, Germany, have invented certain new and useful Improvements in the Treatment of Gases for Removing Carbon Monoxid Therefrom and Replacing It by Hydrogen, of which the following is a specification.

This invention consists in an improved process for freeing water gas or other gases, from carbon mon-oxid in an extremely simple and economical manner whereby a perfect replacement of the carbon mon-oxid by hydrogen is effected with very efficient utilization of the reagents employed.

The process according to this invention consists in passing the gases over heated calcium oxid, or heated calcium hydroxid, while steam is blown into the reaction chamber, the temperature being kept below the temperature of dissociation of calcium carbonate. Experiments have already shown that when carbon mon-oxid is passed over calcium hydroxid, the carbon mon-oxid disappears and hydrogen is produced (see *Berichte der Deut. Chem. Ges.* 1880 Vol. I, page 718), but in these experiments, steam was not passed over the calcium hydroxid along with the gases. I have found that the introduction of steam is absolutely necessary in practice because at the temperatures under which the reactions take place, a large portion of the water of the hydroxid is distilled uselessly, so that the calcium oxid, or calcium hydroxid, is very inefficiently utilized. I have also found that when steam is not introduced, although the carbon mon-oxid is at first replaced by hydrogen, after a short time the carbon mon-oxid disappears without the production of the equivalent amount of hydrogen, because in consequence of the lack of water, carbon is separated as such in accordance with the following equation:

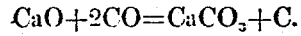

The reaction given in the above named *Berichte der Deutschen Chemischen Gesellschaft* 1880 Vol. I page 718, namely:

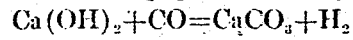

takes place properly only when an excess of steam is present.

The operation may be considerably accelerated by the admixture of metal, apparently because this admixture facilitates the decomposition of water.

The following example will illustrate how this invention can be performed. Water gas containing 40 per cent. of carbon mon-oxid and 50 per cent. of hydrogen and heated to about 500° centigrade, is passed, together with steam, in a suitable apparatus, (for instance, a retort with a stirring apparatus), over calcium oxid, or calcium hydroxid. The carbon mon-oxid disappears and calcium carbonate is formed while, at the same time, for each molecular proportion of carbon mon-oxid a molecular proportion of hydrogen is split off from the steam, as well as from the water which separates from the hydrate.

As a considerable amount of heat is evolved during the process, extraneous heating is not required after the process is started, there being indeed an excess of heat which, if necessary, is removed so that the temperature in the reaction vessel is always below the temperature of dissociation of calcium carbonate (preferably 500° centigrade). The superfluous heat may be employed to evaporate the water required for the reaction, or be utilized for any other operation requiring heat. The reagent is always regenerated. If iron powder (about 5 per cent.) be added to the calcium oxid, or calcium hydroxid, the operation is greatly accelerated.

The advantages which the process, in accordance with this invention, for the removal of carbon mon-oxid have over those hitherto known are, firstly, that for each molecular proportion of carbon, two molecular proportions of hydrogen are obtained in accordance with the equations:

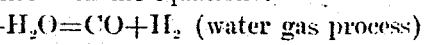

and

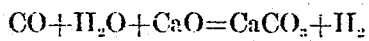

whereas, according to the processes hereinbefore, only one molecular proportion of hydrogen is obtained for each molecular proportion of carbon; secondly, oxids, or hydrates, are used as absorbing agents and these are cheap; thirdly, the absorption process yields a considerable amount of heat and, fourthly, the absorption agent can be easily regenerated.

I claim:

1. The herein described process of treating gas to replace the monoxid therein by hydrogen consisting in passing the gas at a temperature below that of the dissociation of calcium carbonate over a heated calcium compound and simultaneously admitting steam to the reaction chamber.

2. The herein described process of treating gas to replace the monoxid therein by hydrogen consisting in passing the gas at a temperature below that of the dissociation of calcium carbonate over a heated calcium compound in the presence of metal and simultaneously admitting steam to the reaction chamber.

In testimony whereof I have signed my name to this specification in the presence of two subscribing witnesses.

ERNST ELLENBERGER.

Witnesses:
HERMAN PLISCHKE,
MAX LIESCHE.